United States Patent [19]

Akselrud

[11] Patent Number: 5,037,598
[45] Date of Patent: Aug. 6, 1991

[54] RECIPROCATING HEATED NOZZLE

[75] Inventor: Vitaly Akselrud, Richmond Hill, Canada

[73] Assignee: Husky Injection Molding Systems, Ltd., Bolton, Canada

[21] Appl. No.: 509,148

[22] Filed: Apr. 16, 1990

[51] Int. Cl.⁵ .................................................. B29C 45/72
[52] U.S. Cl. .............................. 264/328.9; 264/328.15; 425/549
[58] Field of Search ............... 264/28, 328.14, 328.15, 264/328.9; 425/547, 548, 549

[56] References Cited

U.S. PATENT DOCUMENTS

| | | | |
|---|---|---|---|
| 4,212,624 | 7/1980 | Ando et al. | 425/548 |
| 4,669,971 | 6/1987 | Gellert | 425/549 |
| 4,836,766 | 6/1989 | Gellert | 425/549 |

FOREIGN PATENT DOCUMENTS 59-143624  8/1984  Japan ..................... 425/549

Primary Examiner—Jill L. Heitbrink
Attorney, Agent, or Firm—Bachman & LaPointe

[57] ABSTRACT

A plastic molding system and a method for delivering a melt stream of moldable plastic material to a mold cavity wherein a plastic melt is conveyed through a distribution channel and a mold channel or heated nozzle communicating with the distribution channel to the mold cavity via a mold gate between the mold channel and the mold cavity to fill the mold cavity. The plastic melt is frozen in the gate after the mold cavity is filled to block access from the mold channel to the mold cavity. A heated probe is provided in the mold channel movable from a first position spaced from the mold gate to provide a wide flow channel to the mold cavity to a second position adjacent the mold gate to melt the frozen plastic in the gate.

6 Claims, 2 Drawing Sheets

RECIPROCATING HEATED NOZZLE

BACKGROUND OF THE INVENTION

The present invention relates to a method for delivering a melt stream of moldable plastic material under pressure through a flow passageway into a mold cavity. The plastic melt is conveyed through a distribution channel generally a hot runner or insulated runner and through a mold channel or heated nozzle communicating with the distribution channel to a mold cavity via a mold gate between the mold channel and the mold cavity.

Various means are known in the art to control the flow of resin into the mold cavities through the mold gates. U.S. Pat. No. 4,268,240 shows an air operated valve gate with a heated nozzle combined with a hot runner system for supplying resin to the mold cavity. The mold gate is opened or closed by moving a valve stem into opening or closing position with respect to the mold gate. Heated probes are also known. For example, U.S. Pat. No. 4,376,244 shows a fixed heated probe inside a channel combined with an insulated runner system for supplying a resin to the mold cavity. The gate remains in the open condition relying on ejection pressure to push out the frozen gate slug at the beginning of each injection cycle. An alternate system is shown in U.S. Pat. No. 4,517,453 which uses a fixed heated probe having external and internal heaters combined with a hot runner system. The mold gate is controlled by an internal tip heater. By turning the internal tip heater on or off, the gate can be opened or closed by alternately melting or freezing the small amount of resin in the gate orifice. An additional representative patent showing the use of a fixed heating probe is U.S. Pat. 4,795,126.

An alternate system is shown in U.S. Pat. No. 3,758,248 which uses a heated probe movable by spring pressure to close the gate and movable in the opposite direction by the injection pressure of the resin to open the gate.

Controlling the opening and closing of the mold gate in an efficient and convenient manner and in a rapid operating cycle especially involving a plurality of mold cavities, has presented problems to this art. Firstly, it is naturally highly desirable to be able to open and close the gate in an efficient and convenient manner and in a rapid operating cycle without leakage or drooling of the molten resin. Furthermore, the vestige or mark left on the molded part from the gate orifice has always represented a difficult aspect of hot runner and insulated runner molding.

Using injection pressure to open the mold gate and to compress springs has been found unreliable in multicavity molds especially because simultaneous opening of the gates is usually not achievable since spring pressures may vary from nozzle to nozzle and sometimes the probes may stick or bind in their housings, e.g., because resin has leaked into the spring cavity. Alternatively, the use of fixed probes has not been entirely satisfactory. For example, heat sensitive resins generally have narrow processing windows. Thus, when fixed probes are used in the processing of such heat sensitive resins degradation of the resin may occur in the gate area. The size of the gate orifice in combination with the proximity of the fixed heated probe thereto must be designed to both allow a quick freeze of resin in the gate area to shut off the gate and a large enough flow passage after the frozen resin is melted to allow easy filling when the gate is open. Naturally, also this must be done quickly and expeditiously in a rapid operating cycle. Too large a passage means little or even no freeze off at all, causing melted resin to drool from the mold gate. Too small a passage means restricted resin flow through the gate area causing the resin to be shear heated and often causes resin degradation during filling. Indeed, in some cases fixed heated probes cannot be used when processing heat sensitive resins.

Accordingly, it is a principal object of the present invention to provide a method and apparatus for conveniently and expeditiously delivering a melt stream of moldable plastic material through a mold gate.

It is a further object of the present invention to provide a method and apparatus as aforesaid which is readily usable on multicavity molds and which employs the use of a heated probe in the mold channel.

It is a still further object of the present invention to provide a method and apparatus as aforesaid which is readily usable with heat sensitive resins and which enables quick freeze off of the gate area and rapid opening of the gate area without an overly restricted gate passageway.

Further objects and advantages of the present invention will appear hereinbelow.

SUMMARY OF THE INVENTION

In accordance with the present invention it has now been found that the foregoing objects and advantages may be readily obtained.

In accordance with the present invention a plastic molding system is provided for delivering a melt stream of moldable plastic material under pressure through a flow passageway and into a mold cavity. The system comprises: a distributing plate including a distribution channel for conveying a plastic melt; a nozzle including a mold channel therein communicating with said distribution channel; a mold cavity communicating with said mold channel; a mold gate between the mold cavity and mold channel, wherein molten plastic flows from said distribution channel through said mold channel and gate to fill the mold cavity and freezes in the gate when the mold cavity is filled; and a heated probe in the mold channel movable from a first position spaced from the gate to provide a wide flow channel in the mold gate to a second position adjacent the mold gate to melt the frozen plastic in the gate. Means are provided to move the heated probe from the first to the second position. The mold channel generally comprises a heated nozzle and heating means are generally provided in the distribution plate to maintain the plastic in the molten condition in the distribution channel. Cooling means are generally provided adjacent the gate to cool the gate area.

In addition to the foregoing, the present invention provides a method for delivering a melt stream of moldable plastic material under pressure through a flow passageway into a mold cavity. The method comprises: conveying a plastic melt through a distribution channel and through a mold channel communicating with the distribution channel to a mold cavity via a mold gate between the mold channel and the mold cavity to fill the mold cavity; freezing the plastic melt in the gate after the mold cavity is filled to block access from the mold channel to the mold cavity; providing a heated probe in the mold channel spaced from the gate; moving the heated probe to a position adjacent the gate to melt the frozen plastic and open the gate; and moving the heated probe into a position spaced from the gate to provide a wide flow channel to the mold cavity. The method of the present invention includes the step of feeding the plastic melt to the mold cavity via a heated nozzle and also includes the step of heating the plastic in the distribution channel. In addition, the gate area may be cooled to freeze the plastic in the gate after the mold cavity is filled.

In accordance with the method and apparatus of the present invention it has been found that significant advantages are obtained. The method and apparatus are readily usable in a rapid multicavity system. The present invention conveniently opens and closes the gate area in a synchronized manner in the multicavity system.

The movement of the probe may be controlled by either a hydraulic piston which is more space efficient or an air piston which has less risk of fire. Moreover, the present invention is readily usable with heat sensitive resins. The large flow passage provided in accordance with the present invention avoids excessive shear heating and the movement of the probe efficiently opens the gate area by melting the frozen plastic in the gate.

Further features of the present invention will be seen from the following specification.

BRIEF DESCRIPTION OF THE DRAWINGS

The features of the present invention will be more readily understandable from a consideration of the following illustrative embodiments in which.

DETAILED DESCRIPTION

Figure 1:
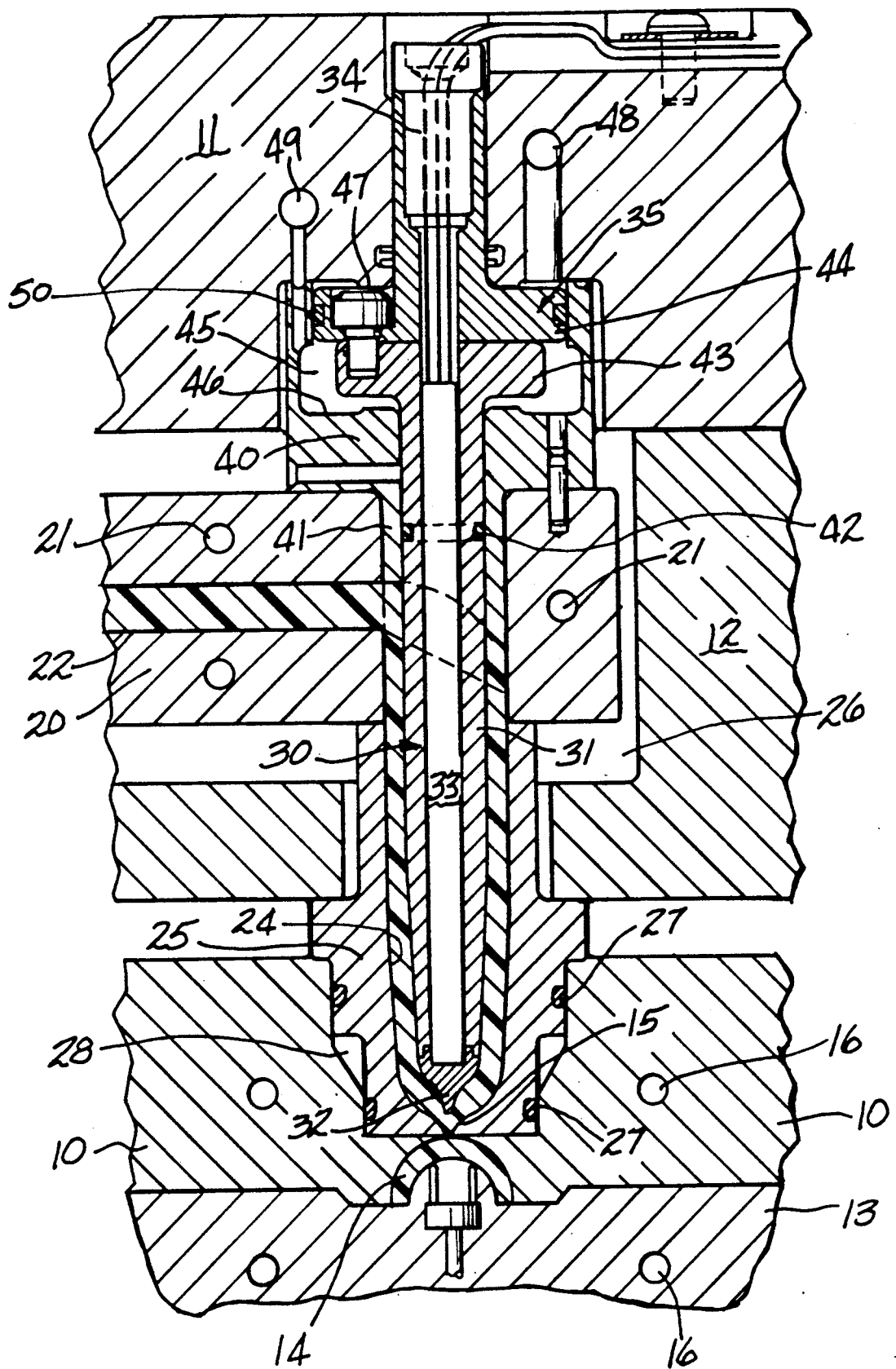
FIG. 1 is a cross-sectional view of the molding system of the present invention with the heated probe in the retracted position and the gate in the open condition.
Figure 2:
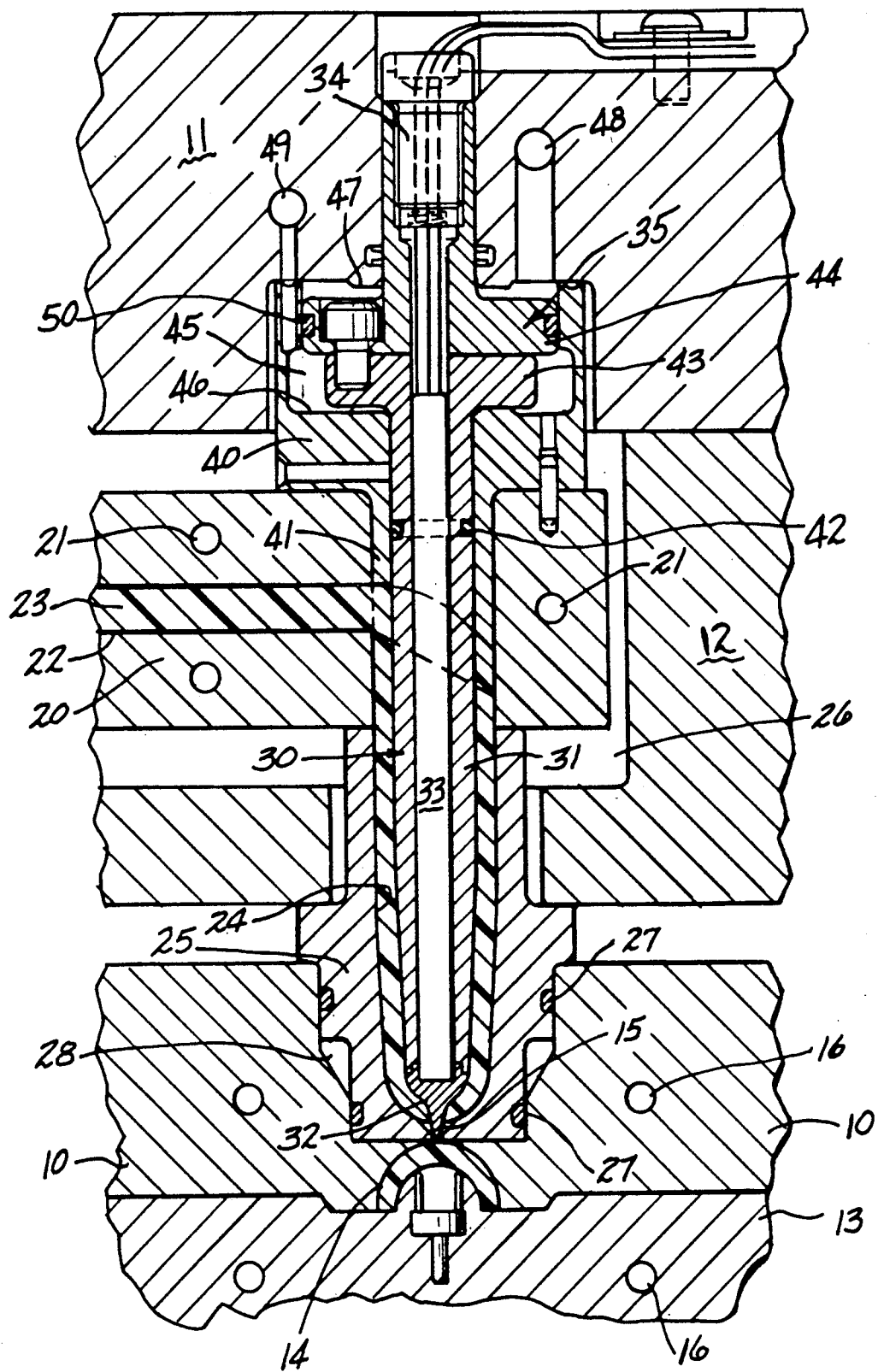
FIG. 2 is a view similar to FIG. 1 with the heated probe in the forward position and the gate in the closed condition.

FIGS. 1 and 2 show a representative embodiment of the present invention, with FIG. 1 showing the gate open and the heated probe retracted and FIG. 2 showing the gate closed and the probe in the forward position adjacent the mold gate. For simplicity only, a single mold cavity has been shown; however, it should be understood that the apparatus and method of the present invention is particularly suitable for multicavity molds wherein the system shown in FIGS. 1 and 2 would be duplicated for each mold.

Referring to FIGS. 1 and 2, stationary mold plate 10 is separated from manifold plate 11 by an intermediate or backing plate 12. Mold plate 10 together with coacting movable mold plate 13 defines a plurality of mold cavities 14, with only one shown in the drawings. The mold cavities 14 are accessible through mold gate 15. Cooling channel 16 may be provided in the mold plates.

Hot runner manifold or distributing plate 20 including manifold heating means 21 supplied by an appropriate heating source (not shown) contains transverse manifold channel or distribution channel 22 which is fed with the desired molten plastic 23 from an appropriate source of molten plastic (not shown) for delivering the molten plastic under pressure. Manifold channel 22 communicates with and feeds molten plastic 23 to axial mold channel 24 in nozzle 25 which may be heated if desired and which in turn feeds the molten plastic to mold 14 via gate 15. Hot runner manifold 20 is bracketed by manifold plate 11 and backing plate 12 but separated therefrom by an air gap 26. Seals 27 are provided between nozzle 25 and mold plate 10 and cooling channels 28 are provided between the nozzle 25 and mold plate 10.

Heated probe 30 is provided which may comprise a steel rod 31 having a shaped, pointed rod tip 32 and containing a central heated core 33 to which current is admitted by cables 34 from an appropriate power source (not shown). Means 35 are provided for moving the heated probe 30 from a first position shown in FIG. 1 spaced from mold gate 15 to provide a wide flow channel in the mold gate to a second position shown in FIG. 2 adjacent mold gate 15. Any desired means may be provided for moving the mold probe, as for example a hydraulic piston which is more space efficient or an air piston which has less risk of fire. The particular embodiment shown in FIGS. 1 and 2 uses an air piston which will be described below.

The heated probe 30 is guided in cylinder 40, boss 41 and nozzle 25. Sealing ring 42 is provided contacting the wall of a bore of boss 41 in which probe 30 is slidable to minimize leakage along the surface of the probe. The end of probe 30 opposite gate 15 is received in cylinder 40 with rod head 43 affixed to piston 44 and movable in cylinder chamber 45 together with piston 44. Lower cylinder chamber wall 46 limits the downward stroke of probe 30 and upper cylinder chamber wall 47 limits the upward stroke of probe 30. Air is admitted to cylinder chamber 45 via air passages 48 and 49, with air passage 48 feeding air to the upper surface of piston 44 to cause downward movement and air passage 49 feeding air to the lower surface of piston 44 to cause upward movement, all in a known manner. An appropriate air source feeds air passages 48 and 49 with appropriate control valves. Thus, when air is admitted to air passage 48 to move piston 44 downward to the position shown in FIG. 2, the air beneath piston 44 escapes via air passage 49 in a known manner. Appropriate seals 50 are provided on piston 44.

Thus, in operation, molten plastic 23 is fed to mold cavity 14 via manifold channel 22, mold channel 24 and gate 15 to fill the mold cavity. Probe 30 is spaced from the gate as shown in FIG. 1 to provide a wide flow path through the mold gate. After the mold cavity is filled, flow thereto ceases and the molten resin in the mold gate freezes. Cooling channels 28 adjacent the mold gate 15 promote rapid freezing of the plastic in the gate area. The frozen plastic in the gate area blocks further access to the mold cavity and permits removal of the molded article by opening movable mold plate 13 in a manner known to the art. After removal of the molded article, movable mold plate is closed, probe 30 is moved from its first position spaced from the gate as shown in FIG. 1 to its second position adjacent the mold gate as shown in FIG. 2 by the appropriate means for moving the probe, as the air piston shown in FIGS. 1 and 2. The heated probe melts the frozen plastic in the gate area, especially with the action of probe tip 32, whereupon the probe is retracted from the position shown in FIG. 2 to the position shown in FIG. 1 to provide a wide gate area for refilling the mold cavity.

The process and apparatus of the present invention overcomes the difficulties obtained heretofore. The present invention is particularly suitable for processing heat sensitive resins in both insulated or hot runner applications. As can be seen from the drawings and discussion herein, a large flow passage is provided to avoid excessive shear heating and the frozen gate is ready and conveniently opened by melting it with the advancing probe, especially using the spaced pointed rod tip. Moreover, the present invention is particularly suitable for multicavity molding.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for delivering a melt stream of moldable plastic material under pressure through a flow passageway into a mold cavity which comprises: conveying plastic melt through a distribution channel and through a mold channel communicating with the distribution channel to a mold cavity via a mold gate between the mold channel and mold cavity to fill the mold cavity; freezing the plastic melt in the gate after the mold cavity is filled to block access from the mold channel to the mold cavity; providing a heated probe in the mold channel spaced from the gate; moving the heated probe to a position adjacent the gate to melt the frozen plastic and open the gate; and moving the heated probe into a position spaced from the gate to provide a wide flow channel to the mold cavity.

2. A method according to claim 1 including the step of feeding the plastic melt to the mold cavity through a nozzle.

3. A method according to claim 1 including the step of heating the plastic in the distribution channel.

4. A method according to claim 1 including the step of cooling the gate to freeze the plastic in the gate after the mold cavity is filled.

5. A method according to claim 1 including the step of conveying a heat sensitive-plastic melt to the mold cavity.

6. A method according to claim 1 including the step of moving a shaped, pointed tip of said probe to a position adjacent the gate to melt the frozen plastic and open the gate.

* * * * *